United States Patent [19]
Shen et al.

[11] Patent Number: 5,987,496
[45] Date of Patent: Nov. 16, 1999

[54] REAL-TIME CHANNEL-BASED REFLECTIVE MEMORY

[75] Inventors: Chia Shen, Arlington, Mass.; Ichiro Mizunuma, Osaka, Japan

[73] Assignee: Mitsubishi Electric Information Technology Center America, Inc. (ITA), Cambridge, Mass.

[21] Appl. No.: 08/760,110

[22] Filed: Dec. 3, 1996

[51] Int. Cl.$^6$ .............................. G06F 13/00; G06F 13/30
[52] U.S. Cl. .......................... 709/200; 709/201; 709/202; 709/214; 709/213; 709/215; 709/216; 709/228; 711/114; 711/141; 711/142; 711/143; 711/147; 711/149; 711/162; 711/165
[58] Field of Search ...................................... 711/162, 165, 711/114, 141, 142, 143, 149, 147; 395/250, 876, 872; 709/215, 200, 201, 202, 216, 213, 228, 214

[56] References Cited

U.S. PATENT DOCUMENTS

| | | | |
|---|---|---|---|
| 5,155,807 | 10/1992 | Blevins et al. | 395/200.46 |
| 5,408,613 | 4/1995 | Okabayashi | 395/200.64 |
| 5,579,503 | 11/1996 | Osborne | 711/119 |
| 5,613,067 | 3/1997 | Brady et al. | 395/200.55 |
| 5,613,162 | 3/1997 | Kabenjian | 395/842 |
| 5,617,537 | 4/1997 | Yamada et al. | 395/200.44 |
| 5,649,102 | 7/1997 | Yamauchi et al. | 395/200.43 |
| 5,659,777 | 8/1997 | Iwasaki et al. | 395/200.46 |
| 5,682,553 | 10/1997 | Osborne | 395/876 |
| 5,684,956 | 11/1997 | Billings | 395/200.49 |
| 5,740,468 | 4/1998 | Hirose | 395/200.64 |
| 5,740,549 | 4/1998 | Reilly et al. | 705/14 |
| 5,819,083 | 9/1993 | Chen et al. | 395/876 |
| 5,838,994 | 1/1996 | Valizadeh | 395/876 |

Primary Examiner—Frank J. Asta
Assistant Examiner—William C. Vaughn, Jr.
Attorney, Agent, or Firm—Dirk Brinkman

[57] ABSTRACT

A computer network guarantees timeliness to distributed real-time applications by allowing an application to specify its timeliness requirements and by ensuring that a data source can meet the specified requirements. A reflective memory area is established by either a data source or an application. A data source maps onto this reflective memory area and writes data into it. In order to receive data from this data source, an application requests attachment to the reflective memory area to which the data source is mapped and specifies timeliness requirements. The application may specify that it needs data either periodically or upon occurrence of some condition. The application allocates buffers at its local node to receive data. The data source then establishes a data push agent thread at its local node, and a virtual channel over the computer network between the data push agent thread and the application attached to its reflective memory area. The data push agent thread transmits data to the application over the virtual channel according to the timeliness requirements specified by the application. Such a channel-based reflective memory system simplifies data sharing and communication by utilizing the typically unidirectional pattern of data sharing and communication. For example, plant data typically is sent from a plant controller to an operator station, and control data typically is sent from an operator station to a plant controller. Additionally, a single writer, multiple reader model of communication is typically sufficient. That is, all of the data does not need to be transmitted to all of the nodes in a computer network all of the time. Thus, flexibility, switchability and scalability are provided by using channels between reader and writer groups. Scalability is provided by using channels to control data reflection and to represent the unidirectional access pattern. By using an asynchronous transfer mode network, flexibility in channel establishment and cost reduction may be achieved.

6 Claims, 13 Drawing Sheets

```
begin
    Read write-pointer I;          /150
    Read buffer ((I-1) mod N);
end              152
           154
```

```
begin
    Read write-pointer I;                    /170
    I' = ((I + 2) mod N + (H-h);             /172
    for i = 1 to h do                         174
        Read buffer I';                       176
        I' = I' + 1;                          178
end
```

```
begin
    Read write-pointer I;                    /* 182 */
    I' = (I + 2) mod N;                      /* 184 */
    while I' not equal to ((I - 1) mod N) do /* 186 */
        Read buffer I';                      /* 188, 190 */
        I' = I' + 1;                         /* 192 */
end
```

REAL-TIME CHANNEL-BASED REFLECTIVE MEMORY

FIELD OF THE INVENTION

The present invention is related to computer network for supporting real-time communication. The present invention is more particularly related to computer networks supporting distributed real-time applications, such as distributed industrial control applications.

BACKGROUND OF THE INVENTION

Some computer applications require a computer network which supports distributed processing. Some distributed applications, particularly industrial control applications, also may require support for real-time communication and control over the computer network. Some support for data sharing by multiple distributed processes may also be needed. While conventional commercially-available computer network systems can support distributed processing and data sharing, many of these conventional computer network systems do not have mechanisms which guarantee timeliness of communication of data for real-time applications.

Some computer memory systems are available which support distributed data sharing in a computer. For example, a distributed shared memory (DSM) provides an illusion of global virtual memory to all computers using the shared memory. It allows for concurrent write operations on different nodes in the network. Such a DSM system, however, requires coherency protocols, consistency models, and other complexities which may not be needed to support distributed real-time processing. Additionally, there is no time constraint guarantee associated with shared memory.

Another computer memory system that supports data sharing is called reflective memory. Such a memory system reflects, or replicates, data to all nodes of a computer network in a bounded amount of time. These reflective memory systems are based on a ring topology and can support only a limited physical memory size. However, data typically does not need to be distributed to all nodes in a system to support distributed real-time processing, but only a few.

Another computer memory system which provides low latency and high performance communication in clustered parallel computing systems is called memory channels. A memory channel is shared by applications which can directly read and write on the memory channel. A memory channel, however, can support only a limited number of nodes and a limited distance between nodes. However, for real-time communication between many nodes, data updates need specific time bounds and frequency which are not supported by a memory channel architecture.

None of these computer systems provide a flexible and scalable architecture which supports communication with specified time limits, i.e., which supports efficiently real-time communication. Accordingly, a general aim of the present invention is to provide a computer network system which supports distributed real-time processing, by providing data reflection with guaranteed timeliness, but also with flexibility and scalability.

SUMMARY OF THE INVENTION

The present invention guarantees timeliness to distributed real-time applications by allowing an application to specify its timeliness requirements and by ensuring that a data source can meet the specified requirements. A reflective memory area initially is established by a data source, an application, or any other system entity. A data source maps to this reflective memory area and writes data into it. In order to receive data from this data source, an application requests attachment to the reflective memory area to which the data source is mapped and specifies timeliness requirements. The application may specify that it needs data either periodically or upon occurrence of some condition. The application allocates buffers at its local node to receive data. The data source then establishes a data push agent thread at its local node and a virtual channel over the computer network between the data push agent thread and the application attached to its reflective memory area. The data push agent thread transmits data to the application over the virtual channel according to the timeliness requirements specified by the application.

The present invention simplifies data sharing and communication by utilizing the typically unidirectional pattern of data sharing and communication. For example, plant data, e.g., in the form of either numerical or video data, typically is sent from a plant controller to an operator station, and control data typically is sent from an operator station to a plant controller. Additionally, a single writer, multiple reader model of communication is typically sufficient. That is, all data does not need to be transmitted to all of the nodes in a computer network all of the time. Thus, by using channels flexibility, switchability and scalability can be provided between reader and writer groups. Scalability is provided by using channels to control data reflection and to represent the unidirectional access pattern. By using an asynchronous transfer mode network, flexibility in channel establishment and cost reduction may be provided.

Accordingly, one aspect of the invention is a computer network system for supporting real-time communication. A first source of data is connected to the computer network, having a memory containing a reflective memory area into which data is written at a first rate. This first source is responsive to a request, to establish a mechanism for periodically transmitting data over a second channel on the computer network at a second rate slower than the first rate and a message size defined by the request. The data rate may be periodic, upon update, or conditional. A second source of data is connected to the computer network having a memory containing a reflective memory area into which data is written at a third rate. The second source is responsive to a request to establish a mechanism for periodically transmitting data over a first channel on the computer network at a fourth rate slower than the third rate and a message size defined by the request. A first destination of data is connected to the computer network and has a mechanism for allocating a buffer memory for receiving data over a channel on the computer network from one of the first and second sources. The buffer memory has size determined by the message size and a number of copies of data that may be read from the buffer memory. A second destination of data is also connected to the computer network, and allocates a buffer memory for receiving data over a channel on the computer network from one of the first and second sources. The buffer memory has a size determined by a message size and a number of copies of data that may be read from the buffer memory.

Another aspect of the invention is a computer network system having first and second source computers. A first destination computer is connected to the computer network and has a memory. The first destination computer sends a request to one of the first and second sources to establish a data path between the source and the first destination computer, wherein the request includes an indication of a rate and a message size. The data rate may be periodic, upon update, or conditional. A buffer is established in the memory of the first destination computer having a size more than twice the message size indicated by the request. A second destination computer is connected to the computer network and has a memory. The second destination computer sends a request to one of the first and second sources to establish a data path between the source and the second destination computer, wherein the request includes an indication of a rate and a message size. The second destination computer establishes a buffer, in the memory of the second destination computer, having a size at least twice the message size of the request. First and second source computers are connected to the computer network and include a memory. They are responsive to a request from one of the first and second destination computers indicating a data rate and message size, to establish a mechanism for periodically transmitting data over a channel in the network to the destination computer according to the indicated data rate and message size.

In one embodiment of the invention, the source computer has a data area having a global identifier, a size, an update frequency and a semaphore with priority inheritance.

BRIEF DESCRIPTION OF THE DRAWING

These and other features of the Subject Invention will be better understood in connection with the Detailed Description taken in conjunction with the Drawing of which.

DETAILED DESCRIPTION

Figure 1:
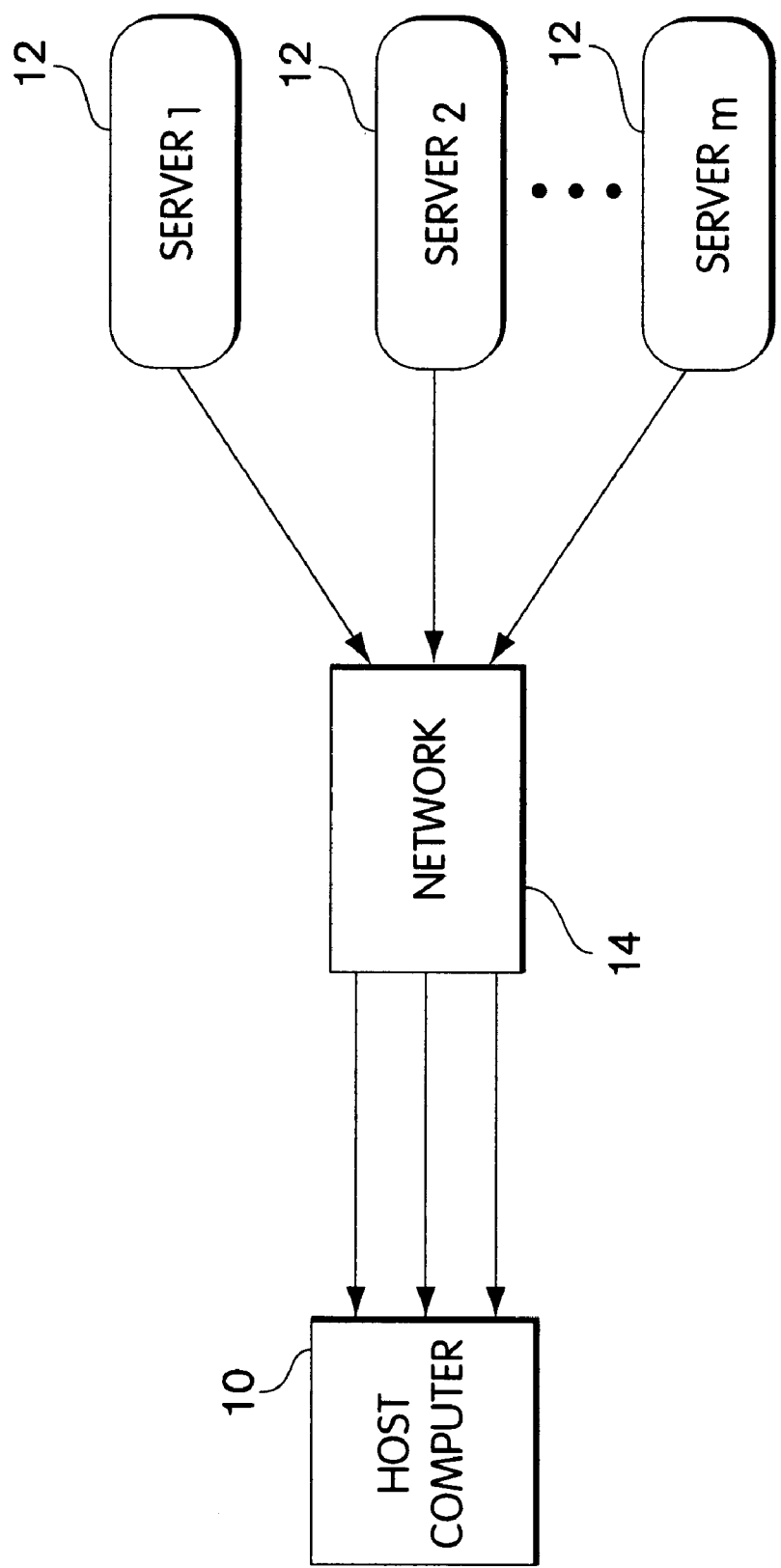
FIG. 1 is a block diagram illustrating a typical asynchronous transfer mode network.

Referring now to FIG. 1, a conventional computer network includes a host 10 which receives data provided by servers 12 via a network 14. The host 10 is connected to the network 14 via a network interface (not shown). A server 12 typically has a data acquisition process that gathers and processes data, for example from a sensor, to be transmitted to the host. The host has applications (not shown) which utilize this data, for example, by displaying it typically with other data, to a user, such as a plant operator.

Figure 2:
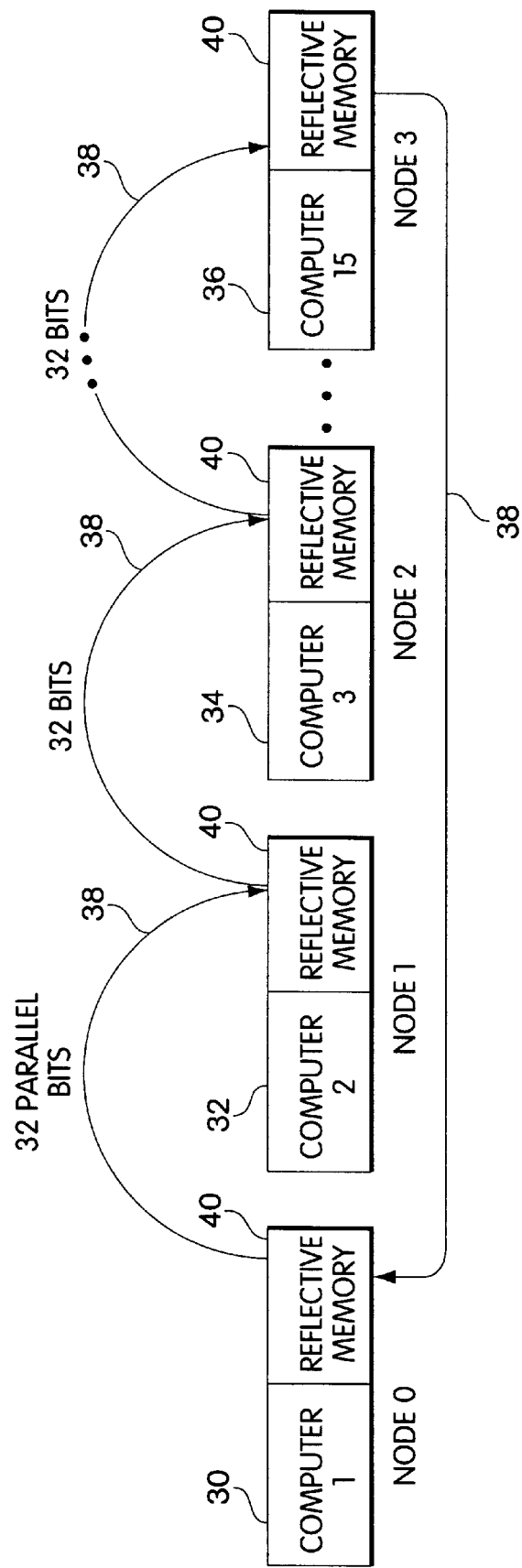
FIG. 2 is a block diagram illustrating a conventional reflective memory system.

Referring now to FIG. 2, a conventional reflective memory system is illustrated. Such a memory system is available from VME Microsystems International Corporation of Huntsville, Ala. In a reflective memory network, there are several nodes or computers 30, 32, 34 and 36 connected in a ring-like topology by a network 38. Each computer includes a reflective memory system 40, which is typically implemented as a dual port memory. When data is stored in one memory location or address at one node, the same data is simultaneously sent to the same memory location in every other reflective memory in the network. The reflective memory appears to the computer as a standard random access memory for both reading and writing. Such a reflective memory may be used to allow computers in the network to share data from a sensor. For example, assume that computer 30 had a sensor which writes data to its own unique address within reflective memory 40. Upon every update to the reflective memory 40, the reflective memory network automatically reflects data to the reflective memories in computer 32, computer 34 and computer 36. The data is tagged with the number of the originating node. The node that originates the data removes it from the ring. Thus, for example, computer 36 would send an update command back to computer 30. Computer 30 would identify the data as having originated from computer 30 and would remove the data from the ring. In such a system, any node may insert data into the flow of data around the ring. While such a reflective memory network is useful when all nodes need to share data, some distributed real-time applications do not require such extensive data distribution.

The present invention overcomes the lack of guaranteed timeliness in conventional local area networks and the limitations and inefficiencies of reflective memory networks by allowing a receiver of data to match its timeliness requirements with the timeliness capabilities of a source of data. A data source, an application or some other entity may create a reflective memory area. A data source maps to the reflective memory area into which it writes data that may be sent to a receiver. A receiver attaches to the reflective memory area. Upon receipt of a signal from the receiver, the source of data establishes a process, herein called a data push agent thread, and a virtual channel or connection to the receiver. The data push agent thread transmits data over the channel from the reflective memory area to the receiver according to the specified requirements. It is possible to multiplex a data push agent thread among several applications. By establishing individual communication channels between a reflective memory area and a receiver, inefficiencies in data transmission are reduced over typical reflective memory networks and flexibility and scalability are achieved, while timeliness of data transmission is guaranteed by the data push agent thread.

Figure 3:
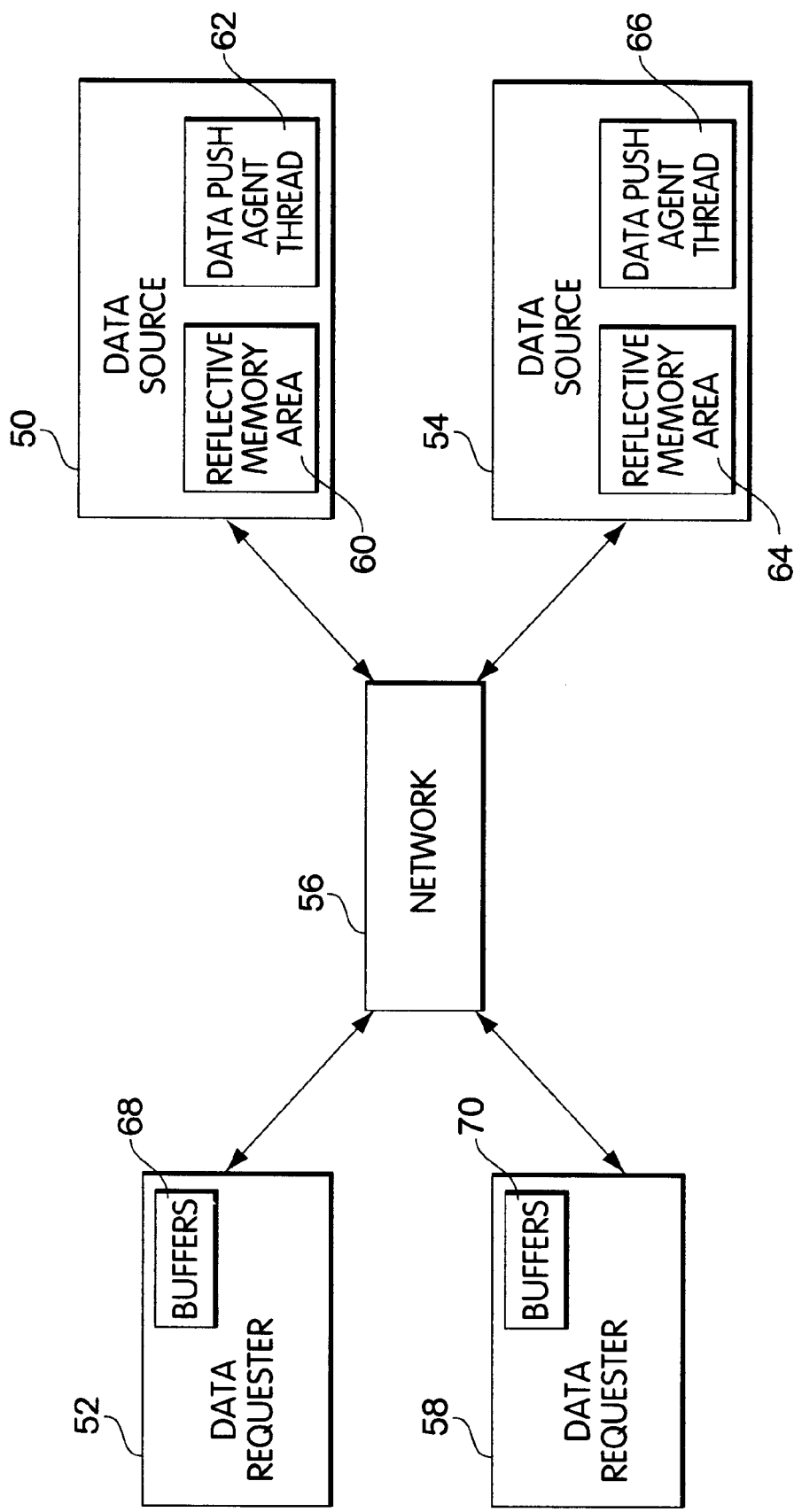
FIG. 3 is a block diagram illustrating a network in accordance with the invention that uses a real-time channel-based reflective memory.

FIG. 3 is a block diagram illustrating one embodiment of the present invention. In this embodiment it is assumed that data access is unidirectional. That is, a data source 50 provides data to a data requester 52 over a network 56. A data requester 52 may also receive data from data source 54. A data source is also referred to as a "writer," while a data requester is referred to as a "reader" or "receiver." Similarly, there may be a second data requester 58 which receives data from either data source 50 or 54 over a network 56. This figure shows each computer as either a reader or a writer. However, a single computer in the network may act as both a writer and a reader. For example, a computer executing a control program may act as a reader to receive data from sensors and may act as a writer to issue commands to a machine.

Each data source has a reflective memory area shown at 60 and 64. The reflective memory area may be created by a data source, an application or other entity. The writer may be, for example, a simple sensor, video controller or an operator. The writer uses the reflective memory area to reflect data to the readers. Upon creation, each reflective memory area is associated with a global identifier, a size, an update period/frequency, and a semaphore for a read/write conflict resolution. An address or pointer is maintained to keep track of the location into which the writer stores data in the reflective memory area. Optionally, a reflective memory area also may be shared by two or more writers. A value also may be stored to indicate this mode of operation.

After a reflective memory area is created, a remote data requester (reader) can attach itself to the reflective memory area by allocating a corresponding buffer area 68 or 70 on its local node in the network and by associating the buffer area on the receiver with the reflective memory area on the source. The association of the buffer area to the reflective memory area involves having the reader specify its quality of service requirements, including its timeliness requirements, such as the frequency that the reader will read its buffer and a deadline on memory-to-memory delay, and the number of past data copies or histories the reader requires. The reader's timeliness requirement for real-time communication is specified as either periodic, upon every data update, or conditional. The period, or minimum inter-arrival time, must be greater than or equal to the update period of the reflective memory area. If the requirements of the reader and capabilities of the writer match, the writer establishes at its local node a process 62 or 66, called a data push agent thread, to periodically transmit data to the receiver. Next, the writer establishes a virtual channel between the writer and the reader over which the data was sent. The data push agent thread may be multiplexed among several receivers using user-level multiplexing such as described in U.S. patent application Ser. No. 08/659,713, filed Jun. 10, 1996.

This channel-based reflective memory system uses a writer-push model, rather than a reader-pull model for communication. That is, once a reflective memory channel is established, the data is written actively into the reflective memory area of the reader by an agent thread residing on the node of the writer. This agent thread represents the quality of service and data reflection requirements of the reader. Accordingly, new values are visible to the remote readers either synchronously or asynchronously depending on the quality of service requirements of the particular reader. This data push communication model using an agent thread minimizes the complexity of the data source computer because the writer does not need to handle remote reads and page faults. Additionally, all read operations are local in nature, because each reader has an agent thread on the writer's machine representing the reader. This thread performs the read locally on the writer's machine, and then sends the read value via the network into the reader's address space on the reader's machine.

By using reflective memory areas, the updates are propagated in a bounded amount of time. By using virtual channels and having reflective memories assigned to channels, the lack of scalability and flexibility in traditional reflective memories are eliminated. By using an asynchronous transfer mode network, both flexibility in channel establishment and cost reduction may be obtained.

Figure 4:
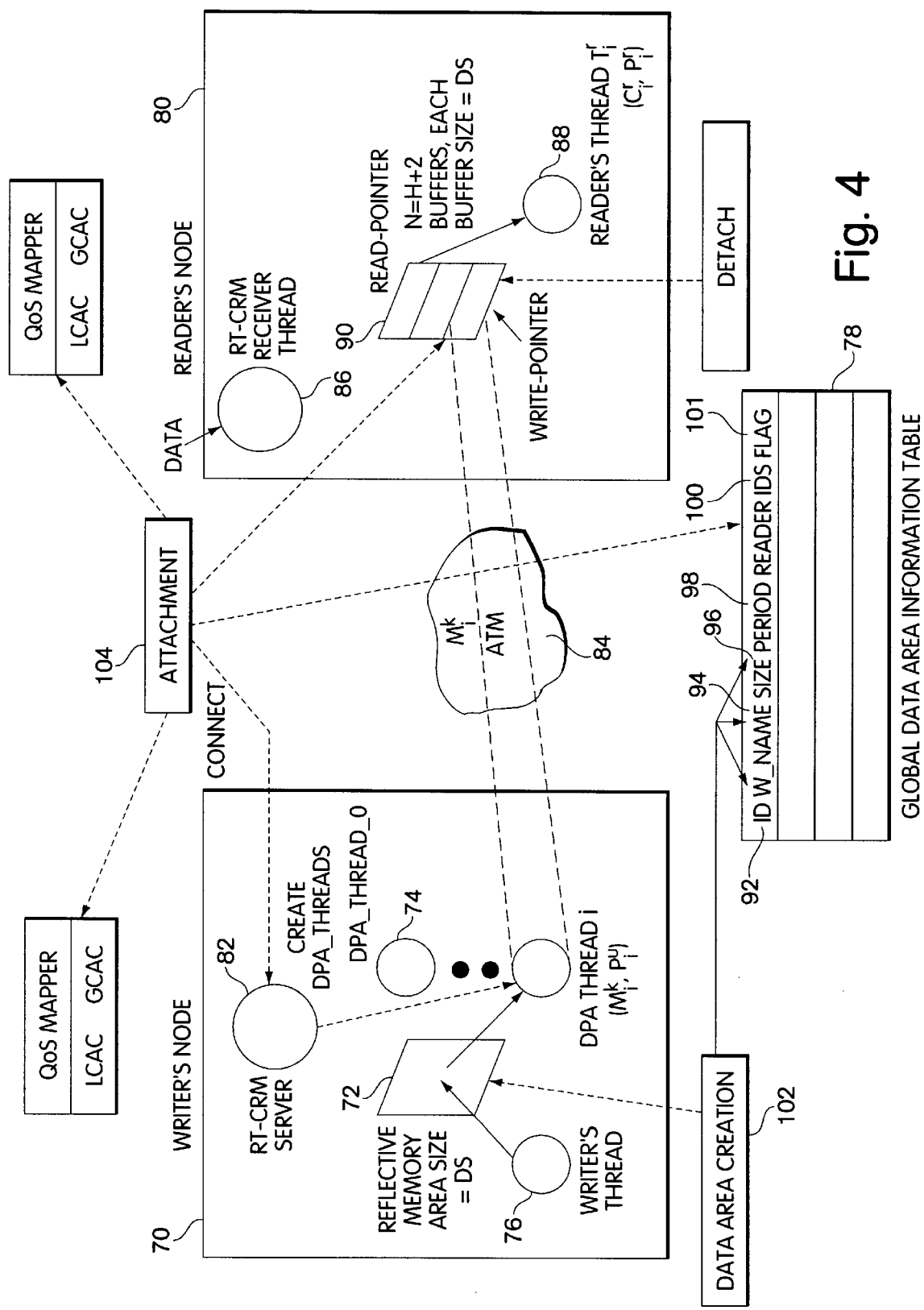
FIG. 4 is a block diagram illustrating how nodes in the network are associated with data push agent threads and reflective memory areas.

FIG. 4 illustrates in more detail the components of a channel-based reflective memory system described above in connection with FIG. 3. In this system, a writer node 70 is connected to a reader node 80 through a network 84, such as an asynchronous transfer mode network. Commercially-available networks, for example, from ForeSystems, Inc., provide hardware and software that includes an application programming interface (API) which allows other software to issue commands to the network to establish virtual channels or circuits, establish connections, allocate virtual paths, etc. Each virtual channel represents a unique connection between a writer 70 and reader 80.

The writer node includes a channel-based reflective memory server 82. Any application may create a reflective memory area of size DS by a request to the server 82. A writer's thread 76 maps to a reflective memory area 72. In response to a request from a reader node 80, the channel-based reflective memory server creates a data push agent thread 74 to read data from reflective memory area 72 and transmit it to the reader node 80. The reader node 80 includes a reader's thread 88 and associated buffer 90. The reader thread periodically reads data in the buffer 90 which is written there by the data push agent thread 74 possibly through the receiver thread 86. A reflective memory area definition table 78 is maintained to keep track of the reflective memory areas, any readers attached to them and any writers mapped to them. This table 78 includes an identifier 92 for the reflective memory area, a name 94 for the writer node 70, the size of the reflective memory area 96, the period 98 with which the area is updated, identifiers 100 of any readers currently attached to that reflective memory area, and a flag 101 indicating whether the period 98 may be modified.

A channel-based reflective memory, in operation, includes the reflective memory area 72, a set of quality of service parameters (capabilities), a field indicating whether the capabilities may be modified, a semaphore with priority inheritance, a writer thread 76 that updates the reflective memory area periodically according to the writer's capabilities, and one or more data push agent threads (DPA_ thread) 74, one for each reader connection, defined by reader's quality of service parameters (requirements).

Figure 5A:
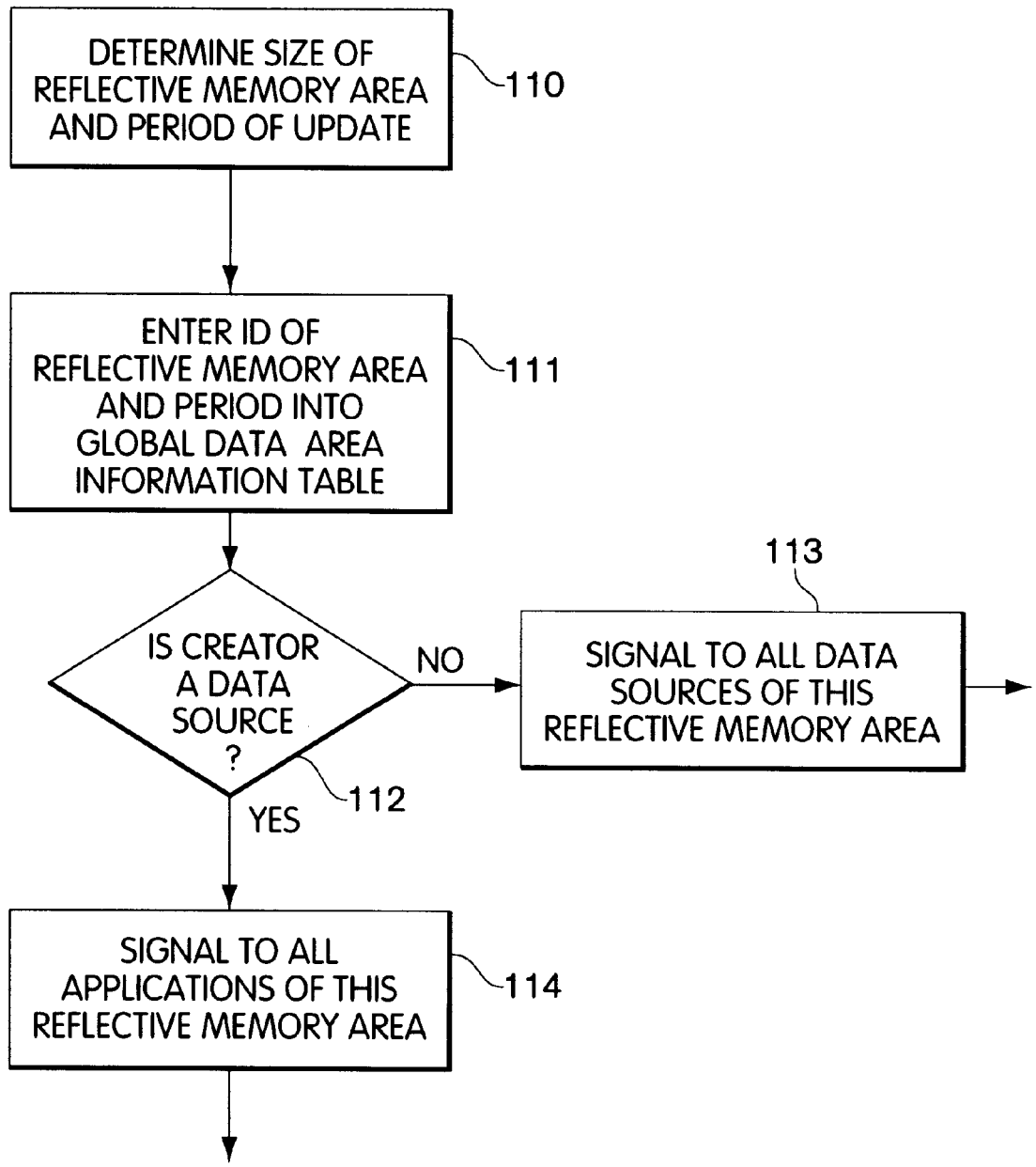
FIG. 5A is flow chart describing how a reflective memory area is created.

A reflective memory area 72 is created and initialized by a writer, a reader or other application. FIG. 5A describes in more detail the process of creating a reflective memory area 72. An application first determines the size of the reflective memory area and the period with which it may be updated by a writer's thread 76 (step 110). An identifier of the reflective memory area and the period of update then are entered into the global data area information table 78 upon issuance of a request to the real time channel-based reflective memory (RT-CRM) server 82. If the creator is a data source, as determined in step 112, all applications are signaled in step 114 of the existence of this reflective memory area. If the creator is not a data source, all data sources are signaled of the existence of this reflective memory area in step 113. Upon creation, the reflective memory area 72 is allocated at the writer's local node of the RT-CRM and the information defining the reflective memory area, initial capabilities and the semaphore are initialized in the reflective memory area definition table 78. This table allows any potential readers to know the capabilities of any writer which may map to this reflective memory area, locate appropriate identifiers and access the semaphore for locking.

Figure 5B:
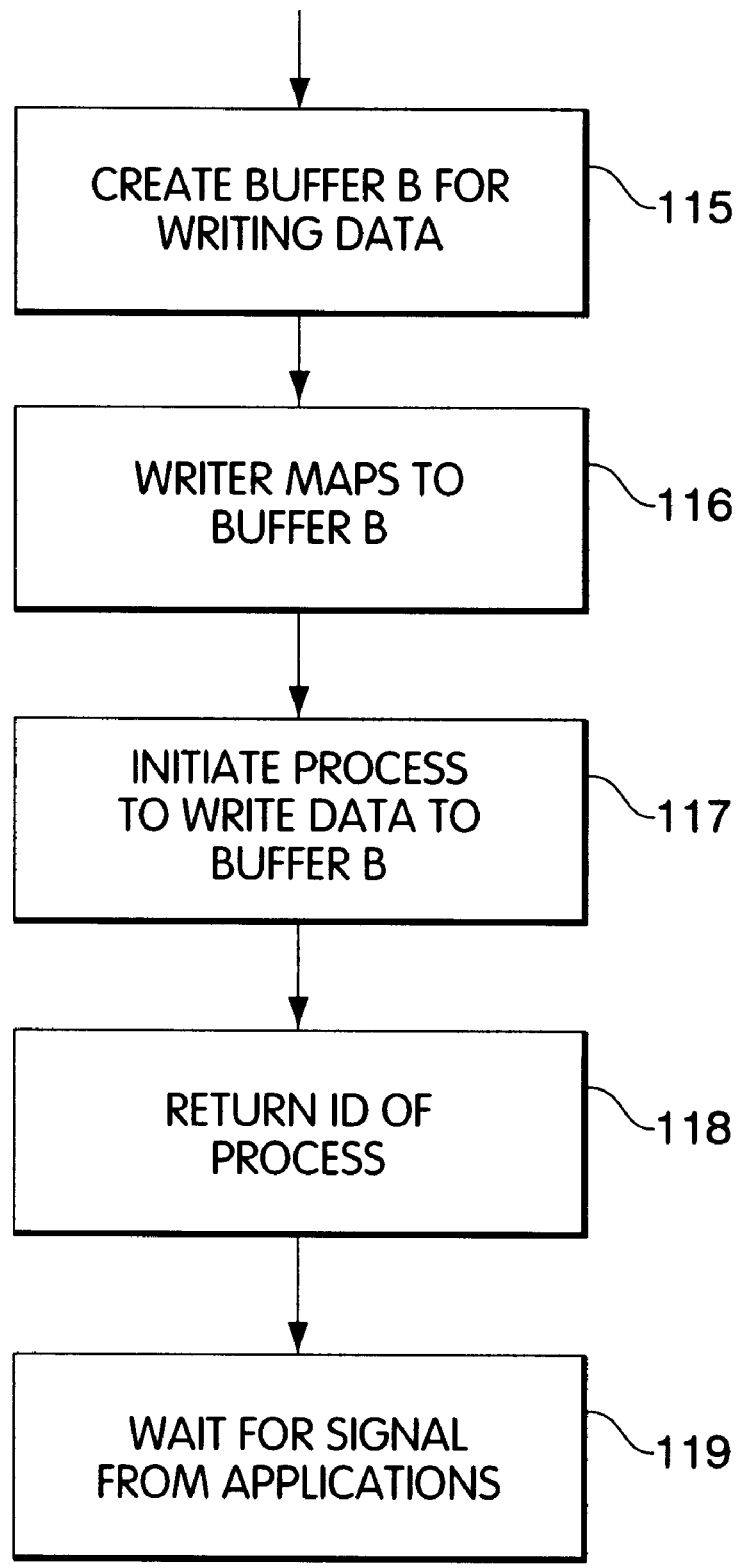
FIG. 5B is a flow chart describing how the writer maps to the reflective memory area.

Referring now to FIG. 5B, the buffer area into which the data is written is created, or allocated, in step 115. The writer then may map to the memory area in step 116. A thread for the writer is then created to write data into the buffer in step 117. The identifier of this thread is then returned in step 118, and is added to table 78. The data source then waits for a signal from an application in step 119.

Figure 6A:
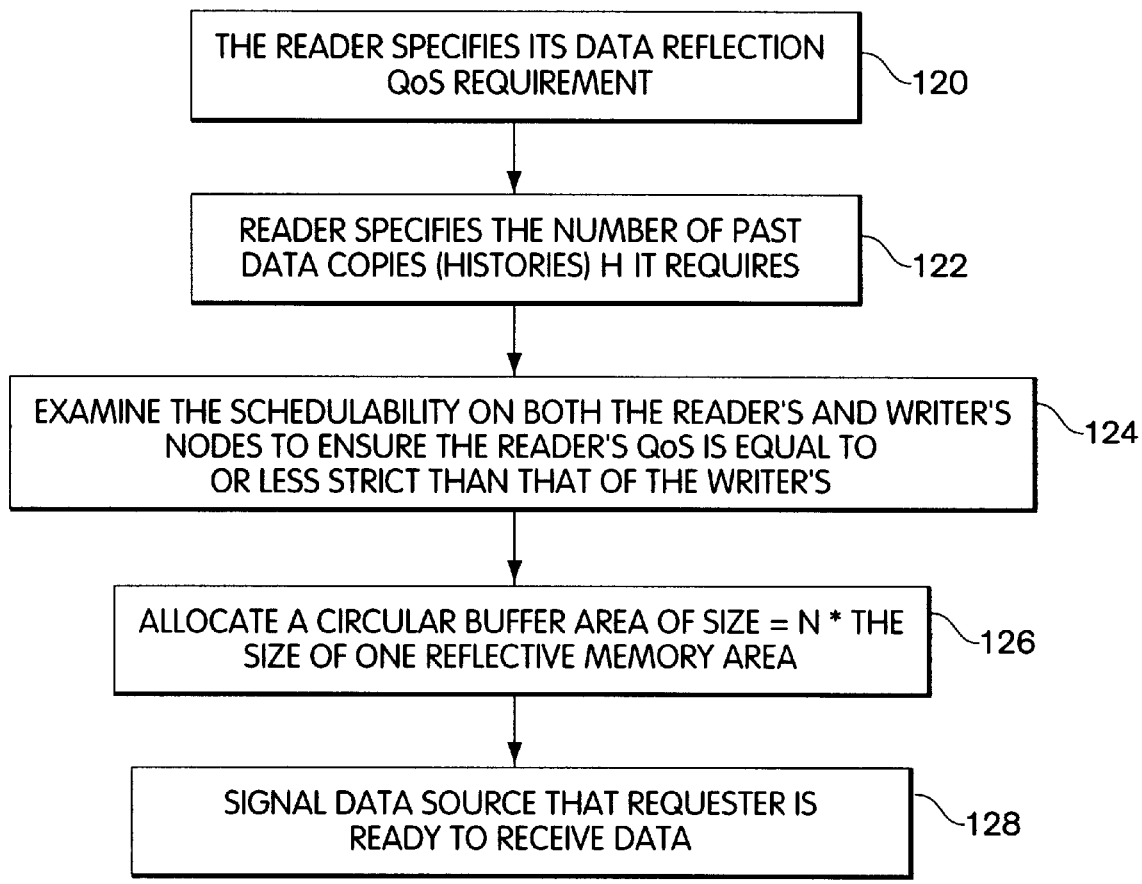
FIG. 6A is a flow chart describing how a reader attaches to a reflective memory area.
Figure 6B:
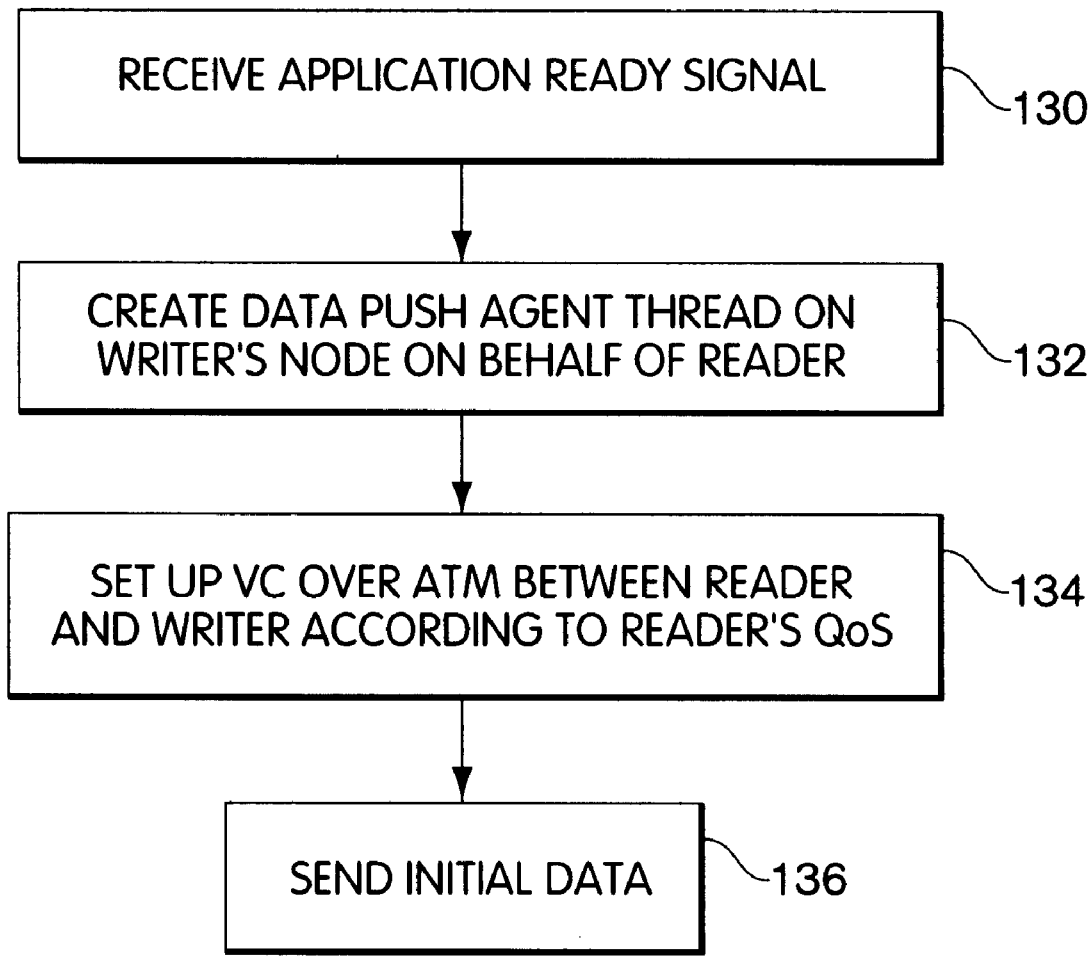
FIG. 6B is a flow chart describing how a writer establishes a thread and a virtual channel or communication with a reader.

If an application needs to utilize data from a reflective memory area 72, it attaches itself as a reader to this reflective memory area, as indicated at 104 in FIG. 4, and as will now be described in more detail in connection with FIG. 6A. The reader first specifies the data reflection quality of service requirements in step 120 and the number of past data copies, i.e., histories H, it requires in step 122. Upon receiving a request from the reader, a server 82 on the writer's node 70 examines the schedulability on both the reader's and writer's nodes in step 124, to ensure that the reader's requirements are equal to or less strict than that of the writer's capabilities. The receiver thread 86 then allocates a circular buffer area 90 of size=N×DS, the size of one reflective memory area in step 126. N is generally the number of histories H that may be requested, plus two, i.e., N=H+2, for reasons described below. This circular buffer is shared between, or mapped to, the application and the network interface or a receiving thread 88. The data source is then signaled in step 128 that the requester is ready to receive data.

When a data source receives a signal from an application indicating that the application is ready to receive data in step 130, the server 82 then creates a data push agent thread (DPA_thread) 74 on the writer's node 70 on behalf of the reader in step 132. This thread is either a periodic thread or a thread waiting on a signal. An identifier of the reader then is placed in the table 78. The server 82 then establishes a virtual channel over the ATM 84 between the reader and the writer according to the reader's requirements in step 134. Once activated, either periodically, or upon an update signal, the DPA_thread 74 locks and reads the reflective memory area 72, unlocks, the area and then transmits the data, as indicated at 136 over the established virtual channel (VC) on the ATM 84 to the circular buffer 90, from which the reader's thread 88 may read the data.

Since a reader's real-time data reflection requirement can be specified as either (a) periodic, (b) upon every data update, or (c) conditional, i.e., when some condition becomes true, DPA_threads can also be of three types, respectively. DPA_threads of type (a) are asynchronous with respect to the writer's thread, while DPA_threads of type (b) and (c) are synchronous. If the reader requires data reflection of types (b) or (c), the corresponding DPA_thread may be signaled whenever the writer thread completes a write operation in the reflective memory area. Since the periodic writer thread is an application thread, it should perform only the write operation in a critical section and it should then release the lock. Whether the writer thread should evaluate conditions to activate any DPA_threads with a conditional data reflection requirement depends on the specific application. For example, if the writer is associated with an operator's command task, then the writer thread should probably instruct the DPA_thread to transmit the operator's commands. On the other hand, if the writer is a periodic sensor, there may be many DPA_threads reading/waiting on the associated reflective memory area. In such a case the writer's thread should not be forced to take on the responsibility of evaluating conditions and signaling all the waiting DPA_threads.

Using such a channel-based reflective memory, there may be access conflicts between data push agent threads and the writer to a reflective memory area. However, the writer should also have higher priority over readers, because the writer is usually constrained, for example by either a physical plant control component, e.g., a sensor's sampling rate or an operator's command issuing timing constraints. Accordingly, on a writer's node local lock-based concurrency control is used between the writer's thread and all of the DPA-threads for potential read-write conflicts. One semaphore is used for one-writer-multiple-reader access of a particular reflective memory area on the writer's machine. The semaphore state should be set to priority inheritance to avoid unbounded wait of the writer when one or more readers are waiting simultaneously for the semaphore to ensure that the writer will not be blocked more than one reader's critical section.

On the reader's node, no locking is needed. Concurrency control and efficiency is achieved via sufficient buffer size at the reader's node. This circular buffer has a size defined by a number N of buffers having the size DS of the reflective memory area to which the reader is attached. This buffer is shared or mapped between the reader application and the network interface or a message receiving thread. As stated above, the number N is defined by the number H of past data copies required by the reader as specified in its quality of service requirements. If the reader needs a maximum number H of past data copies, then N=H+2. For example, if the reader only needs a single copy of the reflective memory area, i.e., the most recent available data, then N=3.

A write-pointer is used that points to the next buffer area in the circular buffer that the next new incoming data will be written into. Using N=H+2 buffers, the reader application can always read the buffer area until it reaches the buffer just before the write-pointer. This design also supports history and other types of higher level applications, e.g., video transmission, that need to read more than one buffer at a time.

This number, N=H+2, of buffers of size DS is necessary and sufficient to ensure that concurrent reads and writes are not issued to the same buffer under the following conditions. A DPA_thread_i is a thread on the writer's machine that reflects data to the reader according to the reader's quality of service requirements. Thus, a DPA_thread_i transmits a data update message $M_i^k$ to the reader's node either periodically, or with a minimum interarrival time $P_i^u$ from DPA_thread_i for an application reader thread $T_i^r$. The time $P_i^u$ has already been guaranteed for DPA_thread_i when DPA_thread_i was created at the time the reader attached itself to the reflective memory area. Thus, with respect to the particular circular buffer used by $T_i^r$ on the reader's node, $P_i^u$ is the period of the writes. $C_i^r$ is the worst case computation time of the operations in thread $T_i^r$ that both calculate an index to a buffer to be read next, and read the buffer. This computation and read time $C_i^r$ is assumed to be less that the write period $P_i^u$ because reading the contents of a local data buffer should require less time than the time required to both transmit the same amount of data over the network and write the data into the data buffer. We assume $P_i^u = P_i^r$ to eliminate unnecessary network traffic from the writer to the reader's node. Since period $P_i^r$ is specified by the application, there is no need to send updates to the copy of the reflective memory area on the reader's node more often than every period $P_i^r$. Due to network queuing and cell scheduling jitter, any data update message $M_i^k$ from DPA_thread_i can experience a maximum network delay of $D\{M_i^k\}_{max}$ and a minimum network delay of $D\{M_i^k\}_{min}$. If message $M_i^k$ incurs a delay $D\{M_i^k\}_{max}$ and message $M_k^{k+1}$ only incurs a delay $D\{M_i^k\}_{min}$ then the two updates from messages $M_i^k$ and $M_i^{k+1}$ may occur in consecutive time periods, i.e., message $M_i^k$ will update the data buffer at the end of the current period $P_i^u$ while message $M_i^{k+1}$ will update the next data buffer at the beginning of the next period $P_i^u$. This is the worst case scenario to guard against when a reader is reading a buffer to avoid race conditions.

A number N=H+2 of buffers is required to avoid locking under these conditions because at least two buffers are used to accommodate updates from two messages which arrive from the network in any two consecutive write periods, and a third buffer allows for reading concurrently.

Additionally this number N is sufficient for the following reasons. The buffers may be indexed by I={1, 2, 3}, and a write-pointer may be used to point to the buffer that is either currently being updated, or is the next buffer to be updated if no update operation is in progress. Reads and writes proceed from buffer I to buffer I+1, mod 3. In this protocol, the read starts at the write-pointer plus 2, mod 3. If the current write pointer is pointing to buffer 1, a read starts in buffer 3. In the worst case, a second update arrives immediately after a previous update and as soon as a read starts. In this case, the write into buffer 1 completes and the write-pointer is incremented to buffer 2. The read in buffer 3 is guaranteed to finish before the write to buffer 2 can complete because the read period is shorter than the write period.

Some operations for reading from such a buffer on the reader node will now be described in connection with FIG. 7A–B to FIGS. 9A–B, using an example of a circular buffer area allocated on the reader's node and having three reflective memory area buffers, each having a size DS. Each buffer in the buffer area has an index I, where I={1, 2, . . . , N}. A write pointer points to, i.e., is the index of, the buffer into which data either is currently being written or will be written next if no write operation is in progress. A read pointer points to, i.e., is the index of, the buffer that is currently being read. The read and write pointers are incremented after each access, modulo N.

If I is the index of the buffer indicated by the write pointer, then a start read operation returns the buffer index I' where I'=(I+2)mod N if N>3, or I'=(I+2)mod N if N=3. The read operation stops at the buffer indexed by I"=(I−1) mod N, where I is the buffer pointed to by the write-pointer. If only the most recent data is to be read, then the start read location is the same as the stop read location. In the case of N=3, (I+2)mod N is the same as (I−1)mod N. Thus for N=3, the buffer index I' is the write-pointer I plus 2, mod N. However, when N >3, the stop read location is calculated in order to read only the most recent data buffer. After writing new data into the buffer I indicated by the write pointer, the write pointer is incremented such that I=(I+1) mod N.

Figures 7A, 7B:
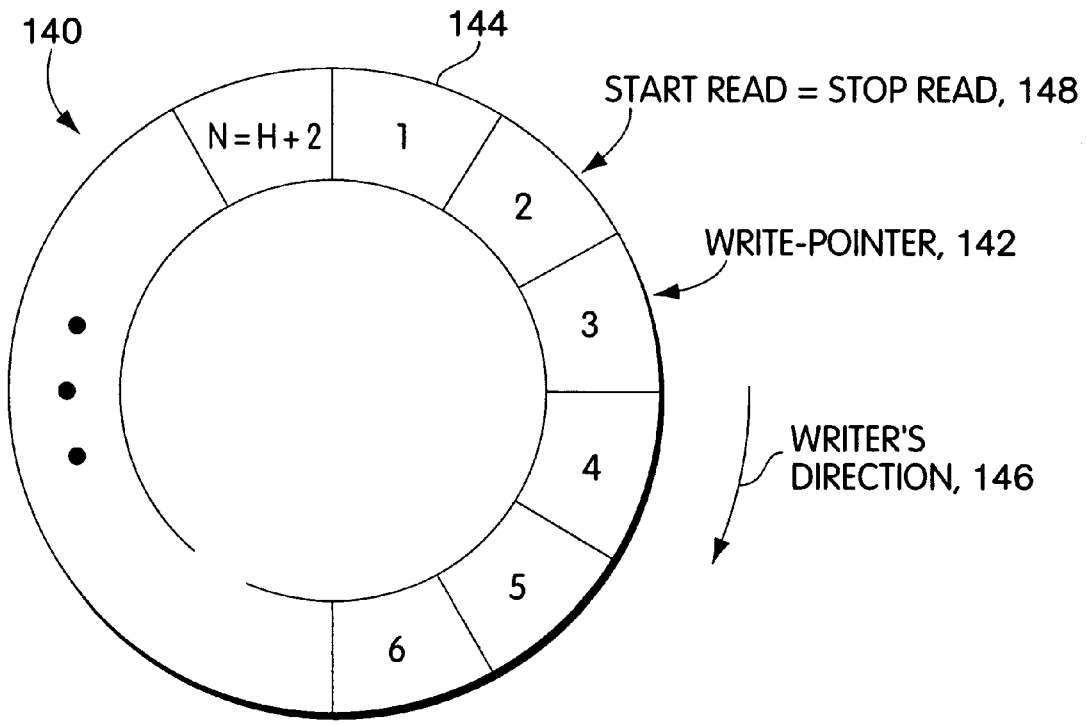
FIG. 7A is a diagram illustrating the reflective memory area on a destination computer used in the process of FIG. 7B.
FIG. 7B is pseudocode describing how a destination reads data received from a source computer.

Referring now to FIGS. 7A–B, a process for reading the most recent data copy is shown. A circular buffer area 140 is shown having N=H+2 buffers 144 and a write pointer 142. The write pointer increments such that updates cycle through the buffers 144 in the direction indicated at 146. As indicated at 148, the start read location and the stop read location are the same. A process for reading this data is shown in pseudocode in FIG. 7B. In this figure, a value I is set to the value read from the write pointer in step 150. The index of the buffer to be read is determined by computing I−1 mod N as indicated at 152. The buffer having the computed index is read as indicated at 154.

Figures 8A, 8B:
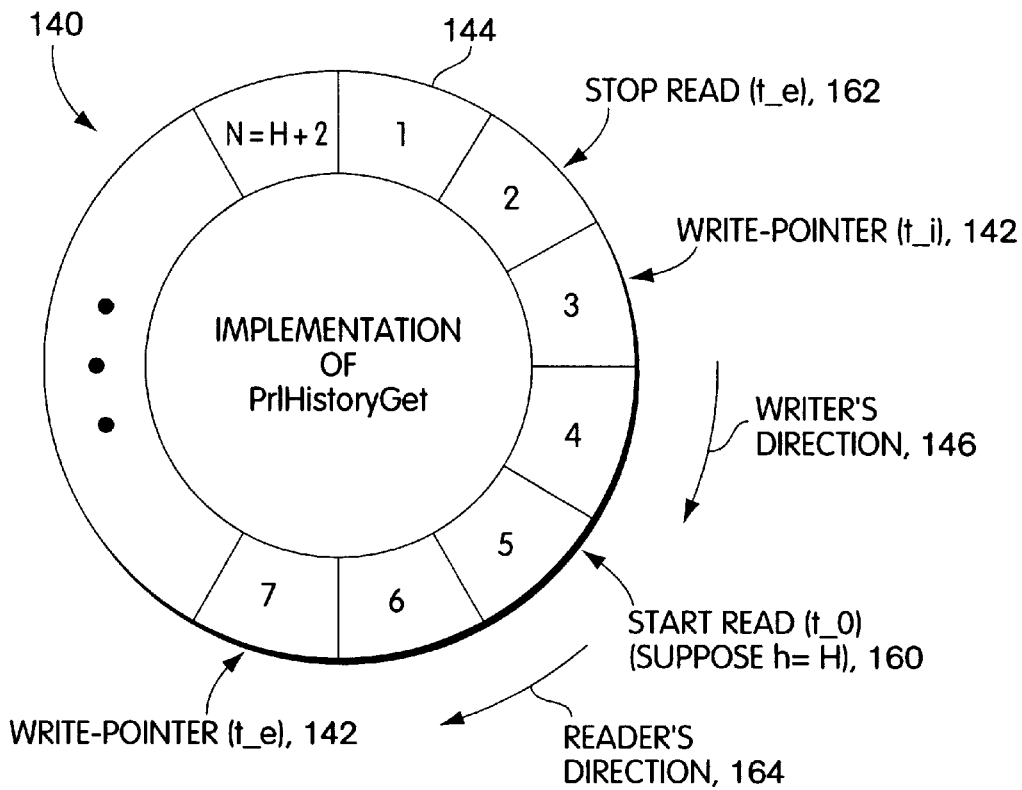
FIG. 8A is a diagram illustrating the reflective memory area used in the process of FIG. 8B.
FIG. 8B is pseudocode describing how a destination reads a history of data from a reflective memory area.

Referring now to FIGS. 8A–B, a process for reading the most recent h copies of data is shown. The same circular buffer area 140 is shown. The value t_0 is the time when the read operations start, and value t_e is the time when the read operations complete. Accordingly, the write pointer 142 indicates buffer 3, for example, at time t_0 and buffer 7, for example, at time t_e. The start read location is indicated at 160, while the stop read location is indicated at 162. The stop read location is the last buffer before the buffer indicated by write pointer(t_0) The read pointer increments in the same direction, indicated at 164, as the write pointer. In FIG. 8B, the write pointer value is read first in step 170. Next, a value I' is calculated from ((I+2) mod N+(H−h)) in step 172. A loop is then commenced, as indicated at 174, in which the buffer corresponding to I' is read in step 176, and I' is incremented in step 178, for the number h times.

Figures 9A, 9B:
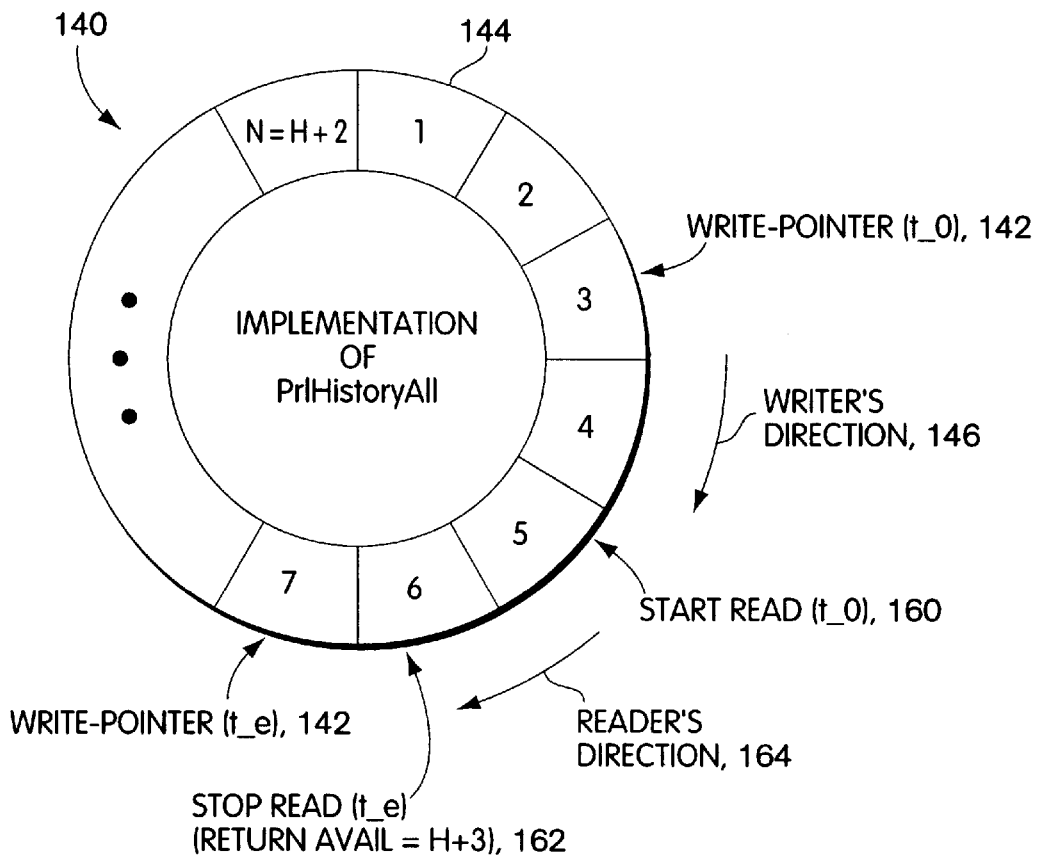
FIG. 9A is a diagram illustrating the reflective memory area used in the process of FIG. 9B.
FIG. 9B is pseudocode describing how an entire history for a given reflective memory area is obtained.

Referring now to FIGS. 9A–B, a process for reading all available data buffers is shown. The same circular buffer 140 is shown. This process is a special case of the process shown in FIGS. 8A–B. In this case, the stop read location 180 is the last buffer preceding the last write location indicated by the write pointer(t_e). Accordingly, as shown in FIG. 9B, the write pointer is first read as indicated in step 182. A value I' is then determined by calculating (I+2) mod N in step 184. A loop is then commenced as indicated at 186. Until I' is equal to (I−1) mod N, as indicated at 188, the buffer I' is read in step 190 and I' is incremented in step 192.

In such a channel-based reflective memory system, the use of a writer-push model and the DPA-threads decouples how data is reflected onto the reader's node from how the reflected data is accessed by the reader. In particular, since a DPA-thread is a separate thread of control from the writer's application thread, the DPA-thread can either push the data to the reader's node synchronously or asynchronously with respect to the write operations conducted by the writer's thread.

Synchronous data push operations are pushes which are triggered by application writes. When the writer's application thread writes data in the reflective memory area, the DPA-thread sends/pushes the contents of the reflective memory area to the reader/receiver immediately or conditionally. This can be implemented with a signal to the DPA-thread from the writer's thread. Asynchronous data push operations are pushes which are performed periodically. The DPA-thread sends the contents of the reflective memory area to the reader periodically, i.e., with independent timing from that of the writer's application.

Similarly, the application reading the data may perform blocking or non-blocking reads. Blocking read operations occur when application reads are blocked while awaiting the arrival of an update message from the writer's node. When the message is received, the reader application thread is signaled. Nonblocking read operations occur when application reads return the current contents of the reflective memory area. The reader's application thread is not notified upon the arrival of data update messages.

This set of data push and read operations allows for four combinations which are useful for application programming. For synchronous data push operations with blocking reads, message transmission is sporadic and delay bounds are defined by application-to-application transfer requirements. This mode is useful, for example, for issuing commands, for example from a plant operator to a machine. For asynchronous data push operations with blocking reads, message transmission is periodic and delay bounds are defined by application to application transfer requirements. This mode is useful, for example, for plotting trend graphs. For synchronous data push operations with nonblocking reads, message transmission is sporadic and delay bounds are defined by memory-to-memory transfer requirements. This mode is useful, for example, for reading plant data. Finally, for asynchronous data push operations with nonblocking reads, message transmission may be periodic or sporadic and delay bounds are determined by memory-to-memory transfer requirements. This mode is useful, for example, for video or file transfer.

Figure 10:
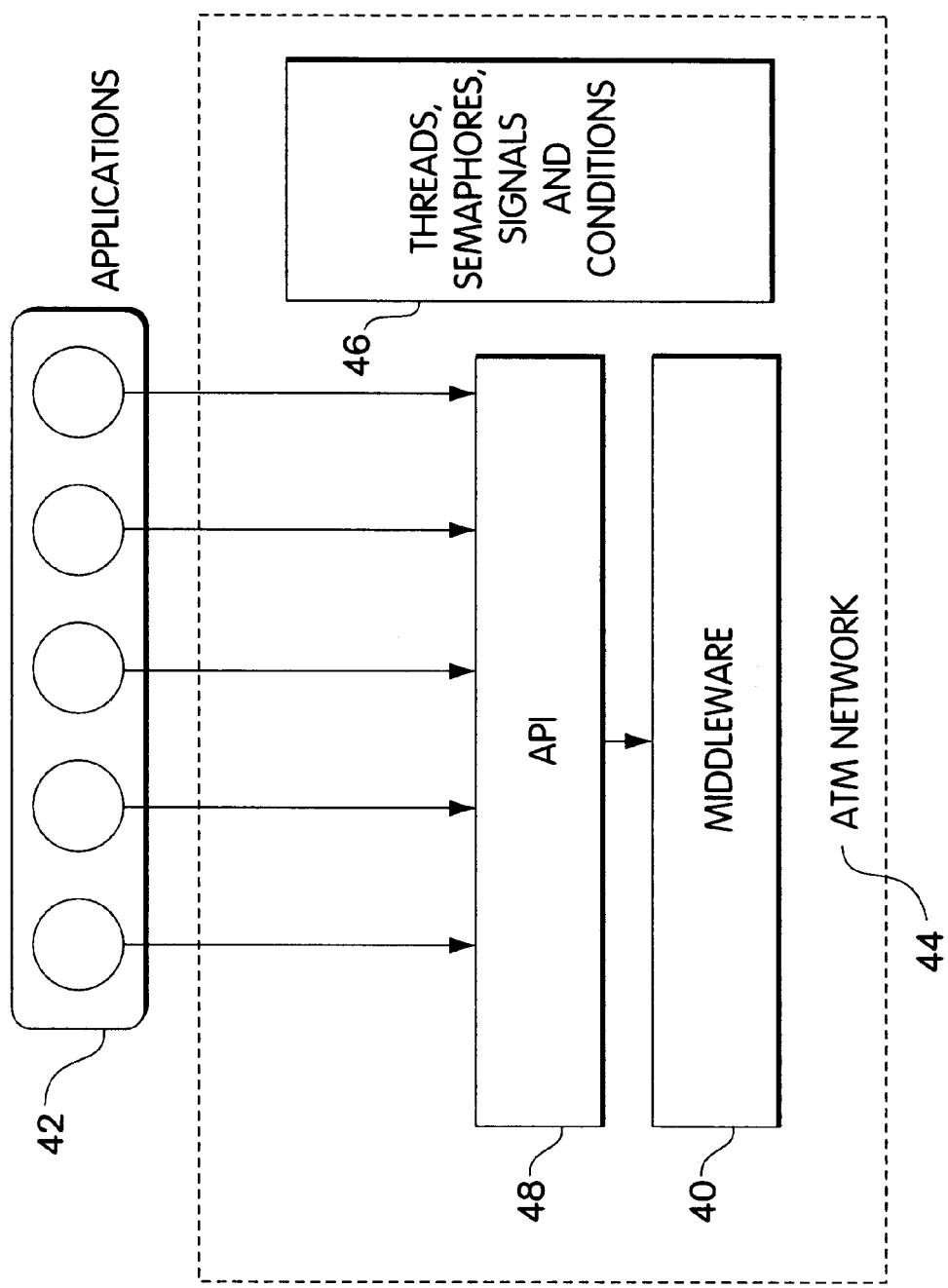
FIG. 10 is a block diagram illustrating layers of software in one embodiment of the present invention.

Referring now to FIG. 10, to simplify application programming the present invention may be implemented in the form of a software layer, herein called "middleware" 40, that communicates between application programs 42 and other software and the ATM network 44 by providing an API 48 to be used by the applications and by utilizing an API (not illustrated) of the ATM network. The middleware may define several functions that can be accessed using the API 48. Such functions include creating reflective memory areas as described in FIG. 5A, processing requests for attachment to those areas as described in FIG. 6A, generating requests for attachment, creating buffers for receiving data, and reading data from buffers as described in FIGS. 7A–B to FIGS. 9A–B. Using such an API, other more sophisticated or useful library functions, such as memory based real-time selective channels, histories, continuous video and video alarm, also can be provided.

A sample set of commands accessible by an API is provided below, with a brief description of their functions. The common parameters used by the library functions include:

m_id, which is the global identifier of the reflective memory area;

m_addr, which is the local memory location into which data is read or written;

m_size, which is the size of the reflective memory area in bytes;

m_H, which is the number of memory buffers of size m_size allocated for the reader;

m_w_period, which is the update period of the reflective memory area of the writer;

m_r_period, which is the update period of the reflective memory area of the reader;

m_deadline, which is the memory-to-memory delay bound that is required by a reader; and m_mode, which indicates whether the reflective memory area can be shared by more than one writer's threads locally.

The API may provide access for all applications to a command for creating a reflective memory area, as described above in connection with FIG. 5A. This command uses the variables: int m_size; int m_w_period; void *m_addr; int m_H; int m_mode; int m_id. As described above, this process creates a reflective memory area of m_size number of bytes per memory buffer and m_H number of buffers. A globally unique id for this reflective memory area is returned in m_id. If m_H is greater than one, the necessary write pointer is created as described in the next section. The value of m_mode can be either shared or exclusive. If m_mode is set to shared, more than one local threads can map this reflective memory area into its address space and thus becomes the writer of the reflective memory area. Having different threads to map to the same memory area allows the application threads to be upgraded, modified or replaced at any time without having to re-establish network connections, or to recreate DPA-threads, etc, allowing the reflective memory channels to be plug-and-play interface points. Also, allowing more than one local asynchronous thread to access the same reflective memory area provides flexibility to writer applications. Two application threads can reflect values to the same reader. On the other hand, there might be applications that would like to restrict the number of writers of a reflective memory area to be only one for security or safety reasons. In such a case the value of m_mode should be set to exclusive.

The API may provide access to several commands for use by writer applications. In particular, commands may be provided to map and unmap threads to a reflective memory area. A thread residing on the local node where the reflective memory area is created may perform such mapping. If the memory area was created with the value of m_mode indicating a shared area, shared access is possible.

Another command can be provided for removing a reflective memory area identified by a received m_id. This process may also terminate all of the DPA-threads and the network channel connections to the readers associated with the removed reflective memory area.

A command can also be provided to write specified data into a reflective memory area at a specified address, such as the write pointer. This command typically will be used by the writer thread. The writer application specifies the following values: int m_id; void *m_addr; void *m_data. The data located at the location defined by pointer m_data is written into the reflective memory area defined by the identifier m_id at the location determined by pointer m_addr.

Given an identifier m_id of a reflective memory area, commands may also be provided to lock and unlock these memory areas. These commands can be implemented using standard semaphores with priority inheritance as discussed above to provide writers with priority. Commands may also be provided through which the reflective memory area may also be cleared.

The API may also provide access to several commands for use by reader applications. One command may allow a reader application to attach to a reflective memory area such as described above in connection with FIG. 6A. The reader application supplies the following parameters: int m_id; int m_H; int m_period; int m_deadline; and void *m_addr. If the m_period is greater than zero, then the reader is periodic. The result of this command is the creation of a channel between the reader application and the writer's node, a DPA_thread on the writer's node and a buffer area on the reader's node. A command may also be provided to detach the reader application. This command simply terminates the DPA-thread and the connection on the writer's node. The initialization of the DPA-thread and a reader thread to store received data in the buffer area may be performed separately from the attachment process by providing additional commands. This is useful when other commands are provided to suspend operation of the DPA-thread. By providing a mechanism to suspend an active DPA-threads, a reader may be attached to several DPA-threads at a time, but only read from a selected set of these over selected channels. Finally, as described above, commands for performing read operations may also be provided.

Figure 11:
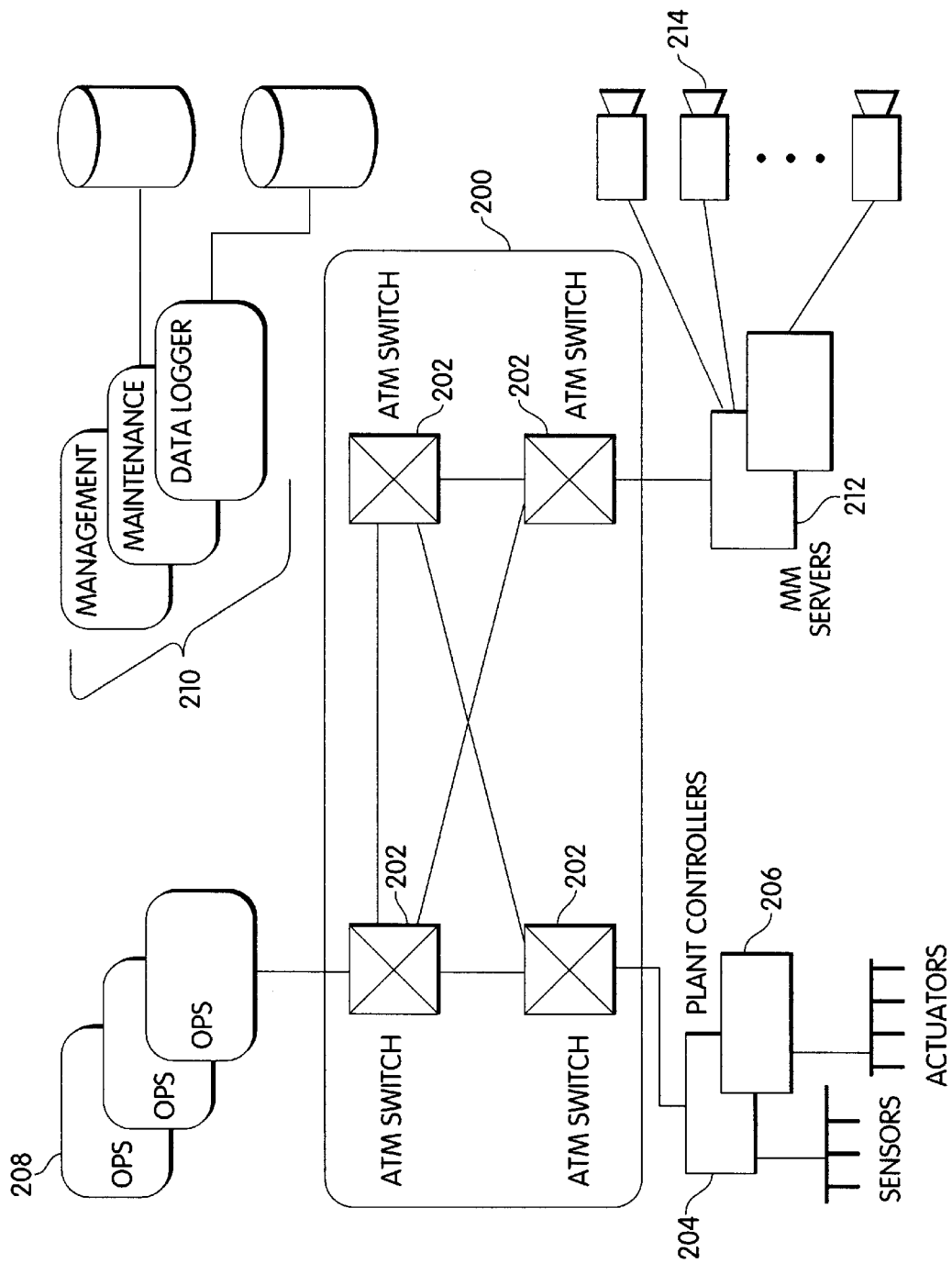
FIG. 11 is an example industrial plant system in accordance with the present invention.

The channel-based reflective memory system as described herein is useful for real-time industrial plant control because it has a mechanism that guarantees timeliness of delivery of data to a reader's node from a writer's node. Referring now to FIG. 11, a sample industrial plant control system is shown. The system includes an ATM network 200 including several ATM switches 202. Sensors 204 and actuators 206 are connected to the network. The sensors detect various information useful in plant control, such as temperature, flow, etc., for transmission to controllers at operator stations 208 and for recording by a data logger, maintenance or management software 210. The actuators 206 are controlled by sending data from the operator stations 208. Multimedia servers 212 transmit multimedia data, such as from video cameras 214, to the operator stations 208 and management, maintenance and logging software 210. The communication of data between the various components of such a system may be supported by the channel-based reflective memory system as described herein.

Having now described a few embodiments of the invention, it should be apparent to those skilled in the art that the foregoing is merely illustrative and not limiting, having been presented by way of example only. Numerous modifications and other embodiments are within the scope of one of ordinary skill in the art. For example, the system may be modified so that read operations with the same quality of service requirements are grouped together as one read operation to improve scalability. These and other modifications are contemplated as falling within the scope of the invention as defined by the appended claims and equivalents thereto.

What is claimed is:

1. A computer network system for supporting real-time communication, comprising:

a computer network;

a first source of data connected to the computer network, having a memory containing a data area into which messages are written at a first rate, and including means, operative in response to a request, for establishing a mechanism for periodically transmitting messages over a channel in the network at a second rate slower than the first rate and a message size defined by the request;

a second source of data connected to the computer network having a memory containing a data area into which messages are written at a third rate, and including means, operative in response to a request, for establishing a mechanism for periodically transmitting messages over a channel in the network at a fourth rate slower than the third rate and a message size defined by the request;

a first destination of data connected to the computer network, having means for allocating a buffer memory for receiving data, from one of the first and second sources, the buffer memory having a size determined by an expected message rate and message size; and a second destination of data connected to the computer network, having means for allocating a buffer memory for receiving data from one of the first and second sources, the buffer memory having a size determined by an expected message rate and message size.

2. The computer network system of claim 1, wherein the source computer has a data area having a global identifier, a size, an update frequency and a semaphore with priority inheritance.

3. The computer network system of claim 1, wherein the message rate is periodic, upon update, or conditional.

4. A computer network system, comprising:

a computer network;

a first destination computer connected to the computer network, having a memory, means for sending a request to one of the first and second sources to establish a data path between the source and the first destination computer, wherein the request includes an indication of a message rate and a message size, and means for establishing, in the memory of the first destination computer, a buffer having a size at least twice the message size of the request;

a second destination computer connected to the computer network, having a memory, means for sending a request to one of the first and second sources to establish a data path between the source and the second destination computer, wherein the request includes an indication of a message rate and a message size, and means for establishing, in the memory of the second destination computer, a buffer having a size at least twice the message size of the request;

a first source computer connected to the computer network and including a memory and means, operative in response to a request from one of the first and second destination computers indicating a message rate and message size, for establishing a mechanism for periodically transmitting data over a channel in the network to the destination computer according to the indicated message rate and message size; and a second source computer connected to the computer network and including a memory and means, operative in response to a request from one of the first and second destination computers indicating a message rate and message size, for establishing a mechanism for periodically transmitting messages over a channel in the network to the destination computer according to the indicated message rate and message size.

5. The computer network system of claim 4, wherein the source computer has a data area having a global identifier, a size, an update frequency and a semaphore with priority inheritance.

6. The computer network system of claim 4, wherein the message rate is periodic, upon update, or conditional.

* * * * *